United States Patent
Sezgin et al.

(10) Patent No.: US 6,795,423 B1
(45) Date of Patent: Sep. 21, 2004

(54) SYSTEM FOR CONTINUOUS WAVE REJECTION

(75) Inventors: Nadir Sezgin, Jackson Heights, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/497,413

(22) Filed: Feb. 4, 2000

(51) Int. Cl.$^7$ ............................................... H04J 13/04
(52) U.S. Cl. ...................... 370/342; 370/335; 375/134; 375/137
(58) Field of Search ............................... 370/342, 335, 370/386, 350; 704/233; 360/46; 375/134, 137, 149

(56) References Cited

U.S. PATENT DOCUMENTS

| | | | |
|---|---|---|---|
| 4,052,568 A | * 10/1977 | Jankowski | 704/233 |
| 5,185,762 A | * 2/1993 | Schilling | 370/342 |
| 5,233,482 A | * 8/1993 | Galbraith et al. | 360/46 |
| 6,049,763 A | * 4/2000 | Christiansen et al. | 360/46 |
| 6,115,368 A | * 9/2000 | Schilling | 370/342 |
| 6,414,951 B1 | * 7/2002 | Ozluturk et al. | 370/342 |

OTHER PUBLICATIONS

Alois M. J. Goiser, *Adaptive Interference Reduction Using Manipulated Signal Statistics*, 1999 IEEE, pp. 277–281.

A. M. J. Goiser and F. J. Seifert, *Adaptive Continuous Wave Interference–Rejection in Digital Spread Spectrum Receivers*, May/Jun. 1990, pp. 247–254.

* cited by examiner

*Primary Examiner*—Salvatore Cangialosi
(74) *Attorney, Agent, or Firm*—Volpe and Koenig P.C.

(57) ABSTRACT

A method is disclosed for receiving transmitted signals in the presence of CW interference in a communication system that determines the presence of a code in a received signal by comparing with a detector threshold calculations made in accordance with a sample of a received signal. Such systems include but are not limited to those incorporating a Sequential Probability Ratio Test. The method includes obtaining a first input power value of the received signal at a first sample time and obtaining a second input power value of the received signal at a second sample time. The first and second power values are compared in order to provide an input sample comparison and the forgoing steps are repeated in order to provide a plurality of input sample comparisons. The detector threshold is adjusted in accordance with the plurality of sample comparisons.

The CW signal can be strongly correlated with a short code used for the acquisition purposes. Therefore in the CDMA systems if the received signal contains a CW signal, then the strong correlation between the CW signal and the short code used for acquisition may result in a false alarm. To prevent this, the following algorithm is suggested to be used for the cancellation of CW, if there is a CW signal present in the received CDMA signal.

28 Claims, 3 Drawing Sheets

SYSTEM FOR CONTINUOUS WAVE REJECTION

BACK OF THE INVENTION

1. Field of the Invention

This invention relates to the field of Code Division Multiple Access (CDMA) communication systems. More particularly, the present invention relates to a system for accurately detecting short codes in a communication environment which includes continuous wave (CW) interference.

2. Description of Prior Art

With the dramatic increase in the use of wireless telecommunication systems in the past decade, the limited portion of the RF spectrum available for use by such systems has become a critical resource. Wireless communications systems employing CDMA techniques provide an efficient use of the available spectrum by accommodating more users than more traditional time division multiple access (TDMA) and frequency division multiple access (FDMA) systems.

In a CDMA system, the same portion of the frequency spectrum is used for communication by all subscriber units. Typically, for each geographical area, a single base station serves a plurality of subscriber units. The baseband data signal within each subscriber unit is multiplied by a pseudorandom code sequence, called the spreading code, which has a much higher transmission rate than the data. Thus, the data signal is spread over the entire available bandwidth. Individual subscriber unit communications are discriminated by assigning a unique spreading code to each communication link.

At times it is also useful in a CDMA system to transmit codes which are of shorter length than the usual spreading code. Instead of using a single, extremely long spreading code, a much shorter code is used and repeated numerous times. The use of short codes provides an advantage over the use of longer codes because the short codes can be detected much more quickly. However, the use of short codes has an inherent drawback, since the short code is repeated many times, it is much less random than a long code. When short codes are used, known detection algorithms can have an increased number of false acquisitions in the presence of continuous wave (CW) interference since the repetitive short codes can correlate with CW interference.

When there is correlation between short codes and CW interference a false acquisition occurs, an incorrect output from a short code detector in a base station can last for a time period equal to the remainder of a short code. For example, in a known prior art short code system, short codes having 195 chips, which are transmitted at a rate of 15 megahertz, repeat for a three millisecond period. At the end of the three millisecond period a new short code is transmitted in the same manner. In such a system it is possible for a detector output to lock up for the remainder of the three millisecond period in response to a false acquisition in the presence of CW interference.

It is known in the art of mobile communication systems which employ CDMA for a base-station receiver to use various detection tests to determine the presence of short codes transmitted by a subscriber unit. One such test known in the art is a sequential probability ratio test (SPRT) detection algorithm. The problem of false detections in the presence of CW interference can occur in detection algorithms such as a SPRT detection algorithm, even though SPRT detection algorithms can be very effective at rejecting noise under other circumstances.

In SPRT detection algorithms, a likelihood ratio is computed and adjusted after each input sample is taken. The repeated adjustments cause the likelihood ratio to increase when a short code is present and decrease when a short code is not present. When the likelihood ratio increases and crosses a predetermined acceptance threshold, a determination is made that a short code is present. When the likelihood ratio decreases and crosses a predetermined rejection threshold, a determination is made that a short code is not present. When the likelihood ratio is between the acceptance and rejection thresholds further samples are taken and further adjustments are made to the likelihood ratio until one of the thresholds is crossed. Thus, the false detection problem can occur in a SPRT detection algorithm when the CW incorrectly causes the likelihood ratio to increase and cross over the acceptance threshold.

It is desirable to provide method for preventing false acquisitions of short codes in the presence of CW interference that does not limit the number of codes available for use within the system.

SUMMARY OF THE INVENTION

A method is disclosed for receiving transmitted signals in the presence of CW interference in a communication system that determines the presence of a short code in a received signal by comparing the output of a detector with threshold calculations made in accordance with a sample of a received signal. Such systems include but are not limited to those incorporating a Sequential Probability Ratio Test detection algorithm. The method includes obtaining a first input power value of the received signal at a first sample time and obtaining a second input power value of the received signal at a second sample time. The first and second power values are compared to provide an input sample comparison and the forgoing steps are repeated to provide a plurality of input sample comparisons. The detector threshold is adjusted in accordance with the plurality of sample comparisons.

DETAILED DESCRIPTION OF THE INVENTION

Figure 1:
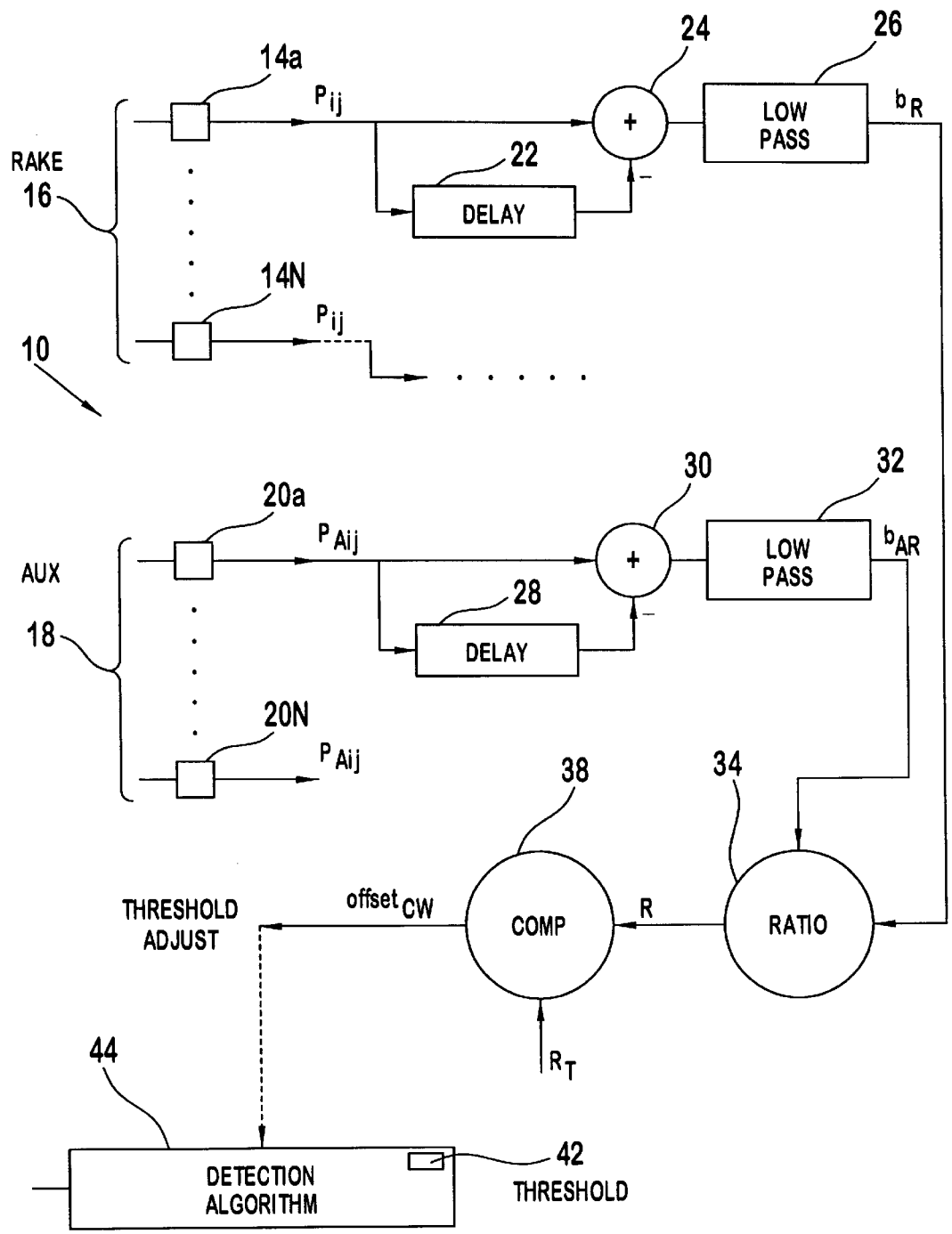
FIG. 1 shows a schematic representation of the system for CW rejection of the present invention.

The features, objects, and advantages of the present invention will become more apparent from the detailed description set forth below when taken in conjunction with the drawings in which like reference characters identify corresponding elements throughout.

Referring now to FIG. 1, there is shown a RAKE despreader system 10. The RAKE despreader system 10 includes a RAKE 16 and an auxiliary (AUX) RAKE 18. The RAKE 16 calculates correlation values between the input signal and a locally-generated short pseudorandom code (hereinafter "short code"). AUX RAKE 18 calculates correlation values between the input signal and a locally-generated long pseudorandom code (hereinafter "long code"). Although the RAKE 16 and AUX RAKE 18 are disclosed with one despreader output each for simplicity, it will be understood by those of skill in the art that both the RAKE 16 and the AUX RAKE 18 can be provided with a plurality of despreaders, each despreader providing an output for a different time sample in accordance with the present invention.

The RAKE 16 provides one or more complex samples which are each converted into a power magnitude value $P_{ij}$ by blocks 14a, ..., 14n. It should be noted here that blocks 14a, 14n and associated despreader equipment may be replicated N times for a system 10 having N despreaders/filters. The power of a sample at time i at the jth RAKE filter is obtained. The power of a sample at time i at the jth RAKE filter is denoted as $P_{ij}$, where j =1, ..., N and N is the total number of filters in the RAKE. It will be recognized by those skilled in the art that blocks 14a, ..., 14n can produce a magnitude value of $P_{ij}$ either with a magnitude function or a squaring function. Power value $P_{ij}$ represents a power determination corresponding to a symbol period within a short code. A symbol period is the period required to transmit one information bit, where the bit has been spread by a pseudo random code. AUX RAKE 18 provides a complex sample which is converted in to a power value $P_{A,ij}$ by block 20. Similarly, block 20 and associated despreader equipment may be replicated and is shown here as blocks 20a, ..., 20N for a system having N despreaders/filters. Output sample value $P_{Aij}$ represents a power determination corresponding to a symbol period.

The relationship between a sample value $P_{ij}$ obtained from RAKE 16 and the previous previous sample value in time $P_{i-1j}$ is random in the case where the input of RAKE despreader system 10 is random. However, the relationship between $P_{ij}$ and $P_{i-1j}$ is correlated when the input includes noise that is correlated with a short code being detected using RAKE despreader system 10. Thus, the relationship between samples $P_{ij}$ and $P_{i-1j}$ is sensitive to the amount of CW interference in the input of RAKE despreader system 10 which correlates with the short code.

The relationship between a sample value $P_{A,ij}$ obtained within AUX RAKE 18 and the previous sample value in time $P_{A,i-1j}$ is random in the case where the input to RAKE despreader system 10 is random. However, AUX RAKE 18 is not correlated with a short code being detected using RAKE despreader system 10. AUX RAKE 18 uses a long pseudo-random code which does not correlate with CW interference. Therefore, the power of any two consecutive samples taken at the output of AUX RAKE 18 are not correlated to each other. Thus, AUX RAKE 18 provides an output substantially representative of background noise in the presence of CW interference. The relationship between the sample values obtained within RAKE 16 and the sample values obtained within AUX RAKE 18 can be used as a measure of the amount of CW interference in the input of RAKE despreader system 10.

Therefore, in accordance with the present invention, at each sample time i, a determination is made of the value of $P_{ij}$-$P_{i-1j}$ at the output of RAKE 16. The value of $P_{ij}P_{i1j}$ can be determined using delay 22 and summer 24 of RAKE despreader system 10 or any other method known to those skilled in the art.

The correlation ($b_r$) between successive input values $P_{ij}$ and $P_{i-1j}$ is found by taking the difference of values $P_{ij}$ and $P_{i-1j}$ and passing this difference through low pass filter 26. In one implementation, low pass filter 26 can be effected by an averaging routine which sums successive outcomes of $P_{ij}$-$P_{i-1j}$ and divides the sum by the number of terms added. In such an implementation, where the predetermined number of sample periods used to determine $b_R$ is K, the average difference value $b_R$ can be expressed as:

$$b_R = \left(\sum_{k=0}^{K-1} P_{i,j-k} - P_{i-1,j-k}\right)/K. \qquad \text{Equation 1}$$

When the input signal of RAKE 16 is only background noise and the sample values $P_{ij}$ and $P_{i-1j}$ have a random relationship with respect to each other, $b_R$ can be expected to have a small value. Since the differences between successive values of $P_{ij}$ will not be correlated to each other in the case of a random relationship then when the successive values of $P_{ij}$ are correlated $b_R$ can provide a measure of the correlation of the samples $P_{ij}$ obtained from RAKE 16.

In a similar manner, during each sample period i, a determination is made of the difference value of $P_{A,ij}P_{A,i-1j}$ N. at the output of AUX RAKE 18. The difference value of $P_{A,ij}$-$P_{A,i-1j}$ can be obtained using delay 28 and summer 30 or any other methods known to those skilled in the art.

The correlation between successive input values $P_{A,ij}$ and $P_{A,i-1j}$ is found by taking the difference of values $P_{A,ij}$ and $P_{A,i-1j}$ and passing this value through low pass filter 32. In one implementation, low pass filter 32 can be effected by an averaging routine which sums successive outcomes of $P_{A,ij}P_{A,i-1j}$ and divides the sum by the number of terms added. The value of $P_{A,i}P_{A,i-1}$ can be averaged over a predetermined number of sample periods to form an average difference value $b_{AR}$ using low pass filter 32. The average difference value $b_{AR}$ provides a measure of the amount of background noise obtained by AUX RAKE 18 and, where the predetermined number of samples is equal to K, can be expressed as:

$$b_{AR} = \left(\sum_{k=0}^{K-1} P_{A,i,j-k} - P_{A,i-1,j-k}\right)/K. \qquad \text{Equation 2}$$

As shown in FIG. 1, the absolute values of $b_R$ and $b_{AR}$ are calculated in block 34 and these absolute values are compared in 38 to the threshold $R_T$. This value, Offset$_{CW}$, is then used to adjust the detection threshold 42 in a detection algorithm 44 such as a Sequential Probability Ratio Test. The presence of CW interference in the input signal will cause Offset$_{CW}$ to have a positive value, which, when added to the SPRT detection threshold, will increase the threshold by an amount proportional to the amount of CW interference. Raising the detection threshold by an amount related to the degree of CW interference, ensures that CW interference will not cause a false detection of a short code. Those skilled in the art will recognize that in a system where the subscriber unit power is adjusted upward until the unit has been acquired by the base station, increasing the SPRT detector threshold in the presence of CW interference will result in the subscriber unit increasing its signal power until a legitimate short code can be acquired by the base station. In an alternative embodiment of the present invention, Offset$_{CW}$ is used to adjust downward a likelihood ratio of an SPRT. This would have the same effect as raising the detection threshold.

Figure 2:
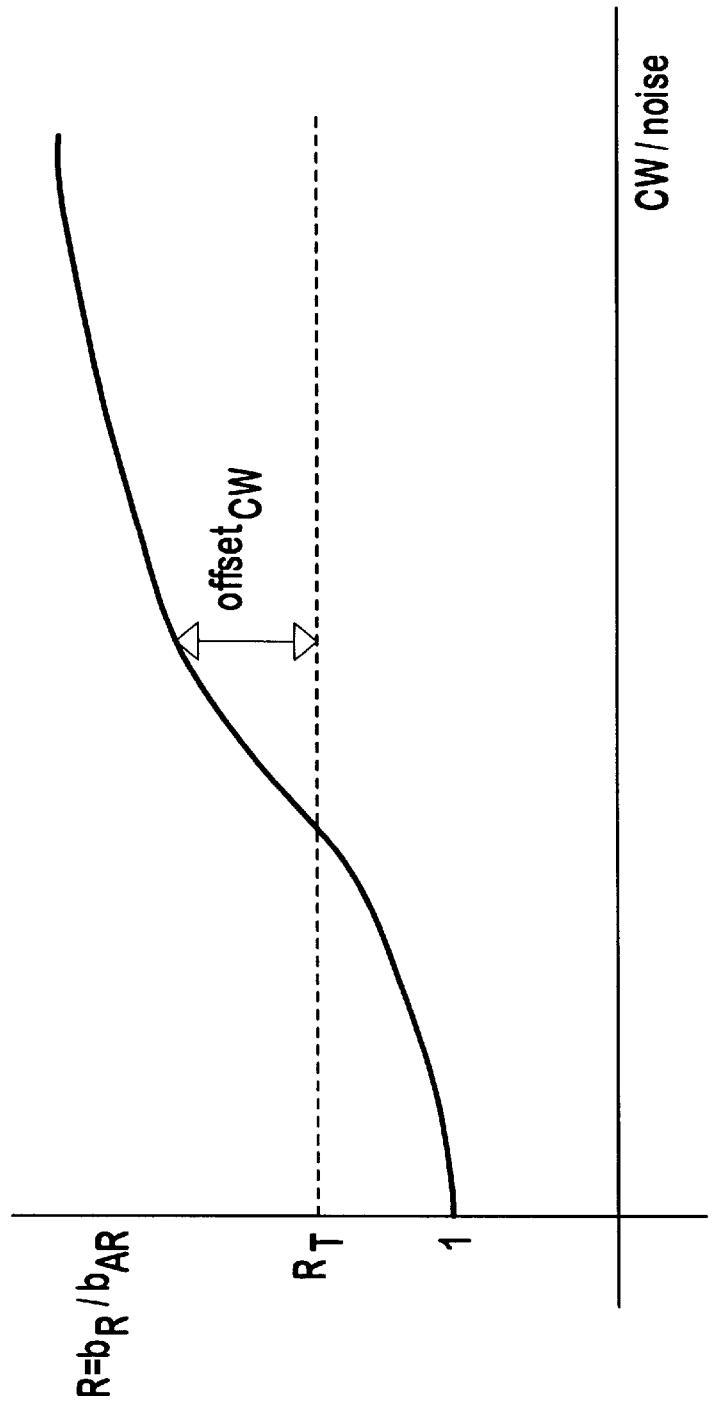
FIG. 2 shows a graphical representation of the relationship between samples obtained within the system of FIG. 1 and CW interference applied to the input of the system of FIG. 1.

Referring now to FIG. 2. there is shown graphical representation 50 of the ratio R =$b_R$/$b_{AR}$. Graphical representation 50 sets forth the relationship between the ratio R and the ratio of CW interference to background noise of the input signal applied to RAKE despreader system 10. When no CW interference is present and $b_R = b_{AR}$, the ratio R reaches its minimum value of one. Under these conditions the false acquisition problems associated with codes having large imbalances do not occur. As CW interference increases with respect to background noise, the ratio R increases proportionally with the amount of CW interference. In another embodiment of the present invention, the ratio R may be calculated, and a threshold value $R_T$ between these two cases is established. Only when R is greater than threshold value $R_T$ is the SPRT or similar detection method detection threshold adjusted by $Offset_{CW}$.

Figure 3:
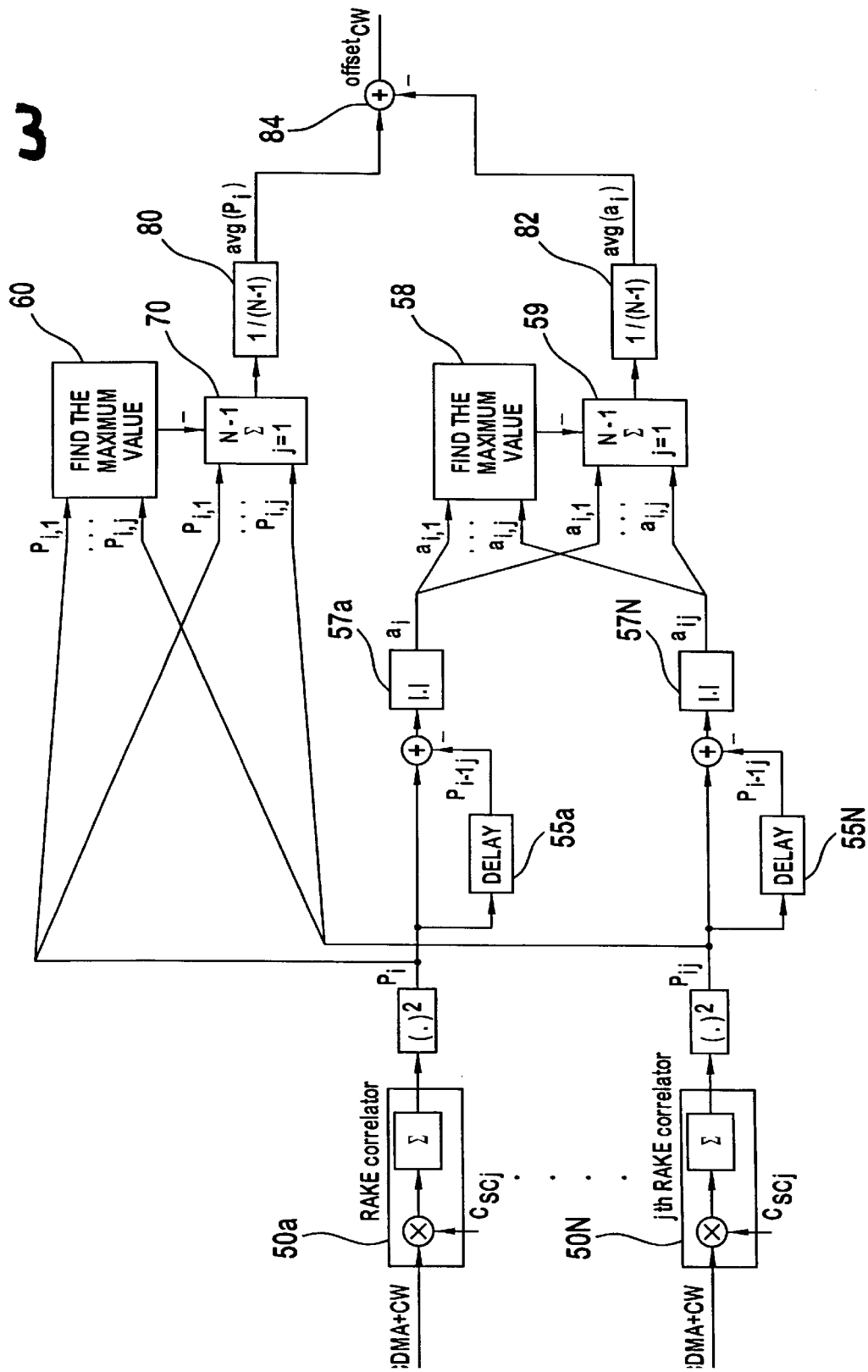
FIG. 3 shows a schematic representation of an alternate system for CW rejection.

An alternate embodiment is shown in FIG. 3. A plurality of RAKE correlators 50a, . . . , 50N receive the CDMA signal containing the CW signal. The complex sample is converted into a power magnitude value $P_{ij}$ where i indicates the sample in time and j indicates the RAKE correlator 50a, . . . , 50N. The maximum power sample MAX $(P_{ij})$ is ascertained at block 60 and that sample is removed at block 70.

The average value of $P_{ij}$, avg$(P_i)$, is obtained by averaging over N−1 of $P_{ij}$ values. That is:

$$avg(P_i) = 1/(N-1) \sum_{j=1}^{N-1} P_{i,j} \qquad \text{Equation 3}$$

Note that the maximum $P_{ij}$ value is not used, since it might contain the signal rather than CW interference. The calculation of avg $(P_i)$ is performed at block 80.

For the jth RAKE filter, the absolute value of the difference between the power samples obtained at time i, $P_{ij}$, and the previous power samples obtained at time i−1, $P_{i-1j}$, is denoted as $a_{ij}$. First, a delay 55a, . . . , 50N is applied to each $P_{ij}$. The absolute value $a_i$, of the difference between the power samples $P_i$ and $P_{i-1j}$ is determined at block 57a, . . . , 57N. The maximum MAX $(a_{ij})$ is removed at block 58.

The average value of $a_{ij}$, avg$(a_i)$, is obtained by averaging over the same N−1 RAKE filters 50a, 50N at blocks 59 and 82. That is:

$$avg(a_i) = 1/(n-1) \sum_{j=1}^{N-1} a_{ij} \qquad \text{Equation 4}$$

Then, avg$(P_i)$ is compared to avg$(a_i)$ at summer 84 in order to find the offset term due to the CW interference present in the CDMA signal. This term is denoted by $offset_{CW}$ and used similarly to the embodiment of FIG. 1 to the threshold 42.

The previous description of the preferred embodiments is provided in order to enable those skilled in the art to make and use the present invention. The various modifications to the embodiments shown will be readily apparent to those skilled in the art, and the generic principles defined herein can be applied to other embodiments without providing an inventive contribution. Thus, the present invention is not intended to be limited to the embodiments shown but is to be accorded the widest scope consistent with the principles and features disclosed.

What is claimed is:

1. A method for receiving transmitted signals in a CDMA communication system having a detector threshold for comparing with the detector threshold calculations made in accordance with a sample of a received signal in order to determine the presence of CW interference in the received signal, comprising the steps of:

(a) obtaining a first input sample of the received signal at a first sample time;

(b) obtaining a second input sample of the received signal at a second sample time;

(c) comparing the first and second samples in order to provide an input sample comparison;

(d) repeating steps (a)–(c) in order to provide a plurality of input sample comparisons; and (e) adjusting the detector threshold in response to at least one of said input sample comparisons, thereby providing an adjustment of the detection threshold in response to detection of said CW interference.

2. The method for receiving transmitted signals of claim 1, comprising the adjusting the detector threshold in response to at least one of said input sample comparisons obtained from the comparison of the first and second samples.

3. The method for receiving transmitted signals of claim 2, comprising the step of determining whether the first and second input samples are representative of CW interference.

4. The method for receiving transmitted signals of claim 3, comprising the step of adjusting the detector threshold in accordance with the CW interference determination.

5. The method for receiving transmitted signals of claim 3, comprising the step of determining an average of the plurality of input sample comparisons.

6. The method for receiving transmitted signals of claim 5, comprising the step of adjusting the detector threshold in accordance with the CW interference .

7. The method for receiving transmitted signals of claim 6, wherein the detector threshold is an upper threshold comprising the step of adjusting the detector threshold upwards in accordance with the CW interference.

8. The method for receiving transmitted signals of claim 2, wherein the step of comparing the first and second input samples comprises performing a subtraction operation upon the first and second input samples.

9. The method for receiving transmitted signals of claim 8, wherein the step of comparing the first and second input samples comprises averaging the first and second input samples.

10. In a CDMA communications system, a method of receiving transmitted signals in the presence of CW interference comprising:

sampling a received signal to generate a plurality of signal samples;

converting each signal sample into a respective power value;

selecting and eliminating a maximum power value from the plurality of power values;

averaging the remaining power values to generate an average power value;

determining an average difference between each power value and the power value of an adjacent sample;

comparing the average power value to the average difference to generate an offset signal for adjusting a detection threshold in response to said CW interference.

11. A CDMA communications system having a noise rejection subsystem, the CDMA system receiving transmitted signals having a detection threshold for detecting codes in the received signals in the presence of CW interference, the CDMA communications system comprising:

a first filter for sampling a received signal and generating a power value for each sample;

a second filter for determining a difference value between power values of adjacent samples;

an averaging device which determines an average power value;

a second averaging device which determines an average difference value; and, a comparator for comparing a ratio of the average power value per the average difference value to a threshold and generating an offset signal for adjusting the threshold in response to the ratio.

12. The noise rejection subsystem of claim 11 further comprising a maximum value device for selecting a maximum power value from the samples.

13. The noise rejection subsystem of claim 12 wherein the averaging device is configured to subtract the selected maximum power value prior to determining the average power value.

14. The noise rejection subsystem of claim 11 further comprising a second maximum value device for selecting a maximum difference value from the samples.

15. The noise rejection subsystem of claim 14 wherein the second averaging device is configured to subtract the selected maximum difference value prior determining the average difference value.

16. A method for a user equipment (UE) to receive transmitted signals in a CDMA communication system having a detection threshold for detecting codes in the received signals in the presence of CW interference in the received signal, characterized by the steps of:

(a) obtaining a first input sample of the received signal at a first sample time;

(b) obtaining a second input sample of the received signal at a second sample time;

(c) comparing the first and second samples in order to provide a first correlation; and (d) adjusting the detection threshold in response to said first correlation when the presence of said CW interference is detected.

17. The method of claim 16 further comprising the steps of:

(f) obtaining at said first sample time a third input sample of the received signal;

(g) obtaining at said second sample time a fourth input sample of the received signal; and (h) comparing said third and fourth input sample and generating therefrom a second correlation; whereby a relationship between said first correlation and said second correlation determines the adjustment to said threshold.

18. The method of claim 17 wherein said comparison of said first and second correlations is equivalent to the amount of CW interference present in said received signal.

19. The method of claim 18 wherein said comparison of said third and fourth correlations is equivalent to the amount of background noise present in said received signal.

20. The method of claim 18 wherein said steps (a)–(c) are repeated in order to provide a plurality of first correlations and steps (f)–(h) are repeated in order to provide a plurality of second correlations.

21. The method of claim 16 wherein said steps (a)–(c) are repeated in order to provide a plurality of first correlations.

22. The method of claim 21 wherein said plurality of first correlations are averaged and said plurality of second correlations are averaged; and whereby the relationship between said first correlation and said second correlation is an adjustment to the detection threshold.

23. A user equipment (UE) for receiving transmitted signals in a CDMA communication system having a detection threshold for detecting codes in the received signals in the presence of CW interference, the UE comprising:

a first filter for obtaining a first input sample at a first sample time and a second input sample at a second sample time;

a second filter responsive to said first and second input samples, for generating a first correlation $b_R$ between said first and second samples; and an adjustment unit for adjusting the detection threshold in response to said first correlation to ensure detection of said codes.

24. The UE of claim 23 wherein said first correlation is equivalent to the amount of CW interference and said second correlation is equivalent to background noise present in said received signal.

25. The UE of claim 24 further comprising:

a third filter for obtaining a third input sample at the first sample time and obtaining a fourth input sample at the second sample time, respectively;

a fourth filter responsive to said third and fourth input samples, for generating a second correlation $b_{AR}$ between said third and fourth input samples; and a comparator, coupled to said second and fourth filters, for comparing said first and second correlations; and said adjustment units adjusting said detection threshold in response to said comparison.

26. The UE of claim 25 wherein said plurality of first correlations are averaged, said averaged first correlations being equivalent to the amount of CW interference present in the received signal.

27. The UE of claim 26 wherein said plurality of second correlations are averaged, said averaged second correlations being equivalent to the amount of background noise in said received signals.

28. The UE of claim 27 wherein said averaged first and second correlations are divided, said comparator comparing said divided correlations to a ratio threshold and generating an offset equivalent to the difference between said divided correlations and said ratio threshold.

* * * * *

UNITED STATES PATENT AND TRADEMARK OFFICE
CERTIFICATE OF CORRECTION

PATENT NO. : 6,795,423 B1
DATED : September 21, 2004
INVENTOR(S) : Sezgin et al.

It is certified that error appears in the above-identified patent and that said Letters Patent is hereby corrected as shown below:

Column 1,
Line 5, delete "BACK" and insert therefor -- BACKGROUND --.

Column 3,
Line 11, after the word "14a,", insert -- ..., --.
Line 32, after the word "time", delete "$P_{i-1j}$" and insert therefor -- $P_{i-1, j}$ --.
Line 35, after the word "between", delete "$P_{ij}$ and $P_{i-1j}$" and insert therefor -- $P_{i,j}$ and $P_{i-1, j}$--.
Line 38, after the word "samples", delete "$P_{ij}$ and $P_{i-1j}$" and insert therefor -- $P_{i,j}$ and $P_{i-1, j}$ --.
Line 41, after the word "value", delete "$P_{A,ij}$" and insert therefor -- $P_{A, i, j}$ --.
Line 43, after the word "time", delete "$P_{A,i-1j}$" and insert therefor --$P_{A, i-1, j}$--.
Line 59, delete "$P_{ij}$-$P_{i-1, j}$" and insert therefor -- $P_{i, j}$ - $P_{i-1, j}$ --.
Line 59, after the second instance of the word "of", delete "$P_{ij}P_{i-1,j}$" and insert therefor -- $P_{i, j}$ - $P_{i-1, j}$ --.
Line 63, after the word "values", delete "$P_{ij}$" and insert therefor -- $P_{i, j}$ --.
Line 64, after the first instance of the word "and", delete "$P_{i-1j}$" and insert therefor -- $P_{i-1, j}$ --.
Line 64, after the word "values", delete "$P_{ij}$" and insert therefor -- $P_{i, j}$ --.
Line 65, delete "$P_{i-1j}$," and insert therefor -- $P_{i-1, j}$ --.

Column 4,
Line 1, delete "$P_{ij}$-$P_{i-1j}$" and insert therefor -- $P_{i, j}$-$P_{i-1, j}$ --.
Line 11, after the word "values", delete "$P_{ij}$ and $P_{i-1j}$" and insert therefor -- $P_{i,j}$ and $P_{i-1, j}$ --.
Line 14, after the word "of", delete "$P_{ij}$" and insert therefor -- $P_{i, j}$ --.
Line 16, after the first instance of the word "of", delete "$P_{ij}$" and insert therefor -- $P_{i, j}$ --.
Line 17, after the word "samples", delete "$P_{ij}$" and insert therefor -- $P_{i, j}$ --.
Line 19, after the second instance of the word "of", delete "$P_{A,ij}P_{A,i-1j}$" and insert therefor -- $P_{A,i,j}$ - $P_{A, i-1, j}$ --.
Line 21, delete "$P_{A,ij}$-$P_{A,i-1j}$" and insert therefor -- $P_{A, i, j}$ - $P_{A, i-1, j}$ --.
Line 23, after the word "values", delete "$P_{A,ij}$" and insert therefor -- $P_{A, i, j}$ --.
Line 24, delete "$P_{A,i-1j}$" and insert therefor --$P_{A, i-1, j}$--.
Line 24, after the word "values" delete "$P_{A,ij}$" and insert therefor -- $P_{A, i, j}$ --.
Line 25, delete "$P_{A,i-1j}$" and insert therefor --$P_{A, i-1, j}$--.
Line 29, delete "$P_{A,ij}P_{A,i-1j}$" and insert therefor -- $P_{A, i, j}$ - $P_{A, i-1, j}$ --.
Line 30, after the word "of", delete "$P_{A,i}P_{A,i-1}$" and insert therefor -- $P_{A, i}$ - $P_{A, i-1}$ --.

UNITED STATES PATENT AND TRADEMARK OFFICE
CERTIFICATE OF CORRECTION

PATENT NO. : 6,795,423 B1
DATED : September 21, 2004
INVENTOR(S) : Sezgin et al.

It is certified that error appears in the above-identified patent and that said Letters Patent is hereby corrected as shown below:

Column 5,
Line 15, after the word "value", delete "$P_{ij}$" and insert therefor -- $P_{i,}$ --.
Line 17, after the word "MAX", delete ($P_{ij}$), and insert therefor -- ($P_{i,j}$) --.
Line 20, after the word "of", delete "$P_{ij}$" and insert therefor -- $P_{i,j}$ --.
Line 21, after the word "of", delete "$P_{ij}$" and insert therefor -- $P_{i,j}$ --.
Line 28, after the word "maximum", delete "$P_{ij}$" and insert therefor -- $P_{i,j}$ --.
Line 32, after the words "time i,", delete "$P_{ij}$" and insert therefor -- $P_{i,j}$ --.
Line 33, after the words "i-1,", delete "$P_{i-1j}$" and insert therefor -- $P_{i-1,j}$ --.
Line 34, after the word "as", delete "$a_{ij}$" and insert therefor -- $a_{i,j}$ --.
Line 35, delete "$P_{ij}$" and insert therefor -- $P_{i,j}$ --.
Line 36, after the word "and", delete "$P_{i-1j}$" and insert therefor -- $P_{i-1,j}$ --.
Line 37, after the word "maximum", delete "MAX ($a_{ij}$)" and insert therefor -- MAX ($a_{i,j}$) --.
Line 39, after the word "of", delete "$a_{ij}$" and insert therefor -- $a_{i,j}$ --.
Line 40, after the word "50a,", insert -- ..., --.
Line 44, delete "$avg(a_i) = 1/(n-1) \sum_{j=1}^{N-1} a_{ij}$" and insert therefor -- $avg(a_i) = 1/(n-1) \sum_{j=1}^{N-1} a_{i,j}$ --.

Line 49, after the word "by", delete "offset$_{CW}$" and insert therefor -- Offset$_{CW}$ --.

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO.   : 6,795,423 B1
DATED        : September 21, 2004
INVENTOR(S)  : Sezgin et al.

It is certified that error appears in the above-identified patent and that said Letters Patent is hereby corrected as shown below:

Column 7,
Line 24, after the word "prior", insert -- to --.

Signed and Sealed this

Twentieth Day of September, 2005

JON W. DUDAS
*Director of the United States Patent and Trademark Office*